US009016640B2

(12) United States Patent
Sawhney et al.

(10) Patent No.: US 9,016,640 B2
(45) Date of Patent: Apr. 28, 2015

(54) INSTRUMENT RETENTION ASSEMBLY

(75) Inventors: Ravi K. Sawhney, Thousand Oaks, CA (US); Kavinder Singh, Columbus, IN (US); John Vernon, Malibu, CA (US)

(73) Assignee: RKS Design, Inc., Thousand Oaks, CA (US)

( * ) Notice: Subject to any disclaimer, the term of this patent is extended or adjusted under 35 U.S.C. 154(b) by 22 days.

(21) Appl. No.: 13/452,616

(22) Filed: Apr. 20, 2012

(65) Prior Publication Data

US 2013/0105643 A1    May 2, 2013

Related U.S. Application Data

(60) Provisional application No. 61/478,447, filed on Apr. 22, 2011.

(51) Int. Cl.

| A47F 5/00 | (2006.01) |
|---|---|
| A45C 11/00 | (2006.01) |
| F16M 11/20 | (2006.01) |
| G10D 3/00 | (2006.01) |
| G10G 5/00 | (2006.01) |

(52) U.S. Cl.
CPC .................. *F16M 11/20* (2013.01); *G10D 3/00* (2013.01); *G10G 5/00* (2013.01)

(58) Field of Classification Search
USPC ........... 248/121, 452, 113, 125.2, 125.7, 451, 248/110, 443, 122.1, 176.1, 124.2; 84/327, 84/379, 421, 329; 206/314; 224/197–200
See application file for complete search history.

(56) References Cited

U.S. PATENT DOCUMENTS

| 4,882,969 | A | 11/1989 | Ricca | |
|---|---|---|---|---|
| 5,031,868 | A * | 7/1991 | Thomas, II | 248/283.1 |
| 5,174,533 | A | 12/1992 | Pryor et al. | |
| 5,410,937 | A | 5/1995 | Okamoto et al. | |
| 5,449,104 | A | 9/1995 | Parsons et al. | |
| 6,107,558 | A | 8/2000 | Cowan | |
| 6,121,527 | A | 9/2000 | Hamm | |
| 6,281,417 | B1 | 8/2001 | Ladao | |
| 6,513,768 | B1 * | 2/2003 | Hsieh | 248/121 |
| 6,600,827 | B2 | 7/2003 | Lu | |
| 6,850,252 | B1 | 2/2005 | Hoffberg | |
| 6,881,884 | B2 * | 4/2005 | Hsieh | 84/327 |
| 7,204,375 | B2 | 4/2007 | Paiste et al. | |
| 7,342,162 | B2 | 3/2008 | Tai | |
| 7,547,835 | B1 * | 6/2009 | Mayor | 84/327 |
| 7,560,630 | B1 | 7/2009 | Keenan, Jr. | |
| 7,579,537 | B2 * | 8/2009 | Lippert et al. | 84/327 |
| 7,647,676 | B2 | 1/2010 | Carnevali | |
| 7,777,110 | B2 | 8/2010 | Wallis | |
| 7,888,573 | B1 | 2/2011 | Darbon | |
| 7,906,717 | B2 | 3/2011 | Wang | |

(Continued)

*Primary Examiner* — Christopher Garft
(74) *Attorney, Agent, or Firm* — Hall Estill Attorneys at Law; Daniel P. Dooley

(57) ABSTRACT

A stationary base with at least two door shrouds extending from a tower portion. The tower portion has at least one groove communicating with a groove guide. An actuating housing is attached to the groove guide and connected to at least one force member positioned between the base and the actuating housing. At least one containment door is positioned in a door groove adjacent each door shroud. Each containment door communicates with the actuating housing with at least one guide pin positioned in a guide slot of each containment door, the guide slot being angled at a predetermined angle to translate vertical movement of the actuating housing to horizontal movement of each containment door.

14 Claims, 5 Drawing Sheets

(56) References Cited

U.S. PATENT DOCUMENTS

| | | | |
|---|---|---|---|
| 8,020,817 B2* | 9/2011 | Yu | 248/125.8 |
| 8,063,291 B2 | 11/2011 | Crowder et al. | |
| 8,157,731 B2 | 4/2012 | Teller et al. | |
| 2002/0070319 A1 | 6/2002 | Yu | |
| 2005/0000348 A1 | 1/2005 | Workman | |
| 2005/0279902 A1 | 12/2005 | Richter | |
| 2006/0213351 A1* | 9/2006 | Hsieh | 84/327 |
| 2008/0028913 A1 | 2/2008 | Driscoll | |
| 2008/0168883 A1* | 7/2008 | Chen | 84/327 |
| 2009/0173863 A1 | 7/2009 | Crown | |
| 2013/0206932 A1* | 8/2013 | Henry | 248/121 |

* cited by examiner

FIG. 1
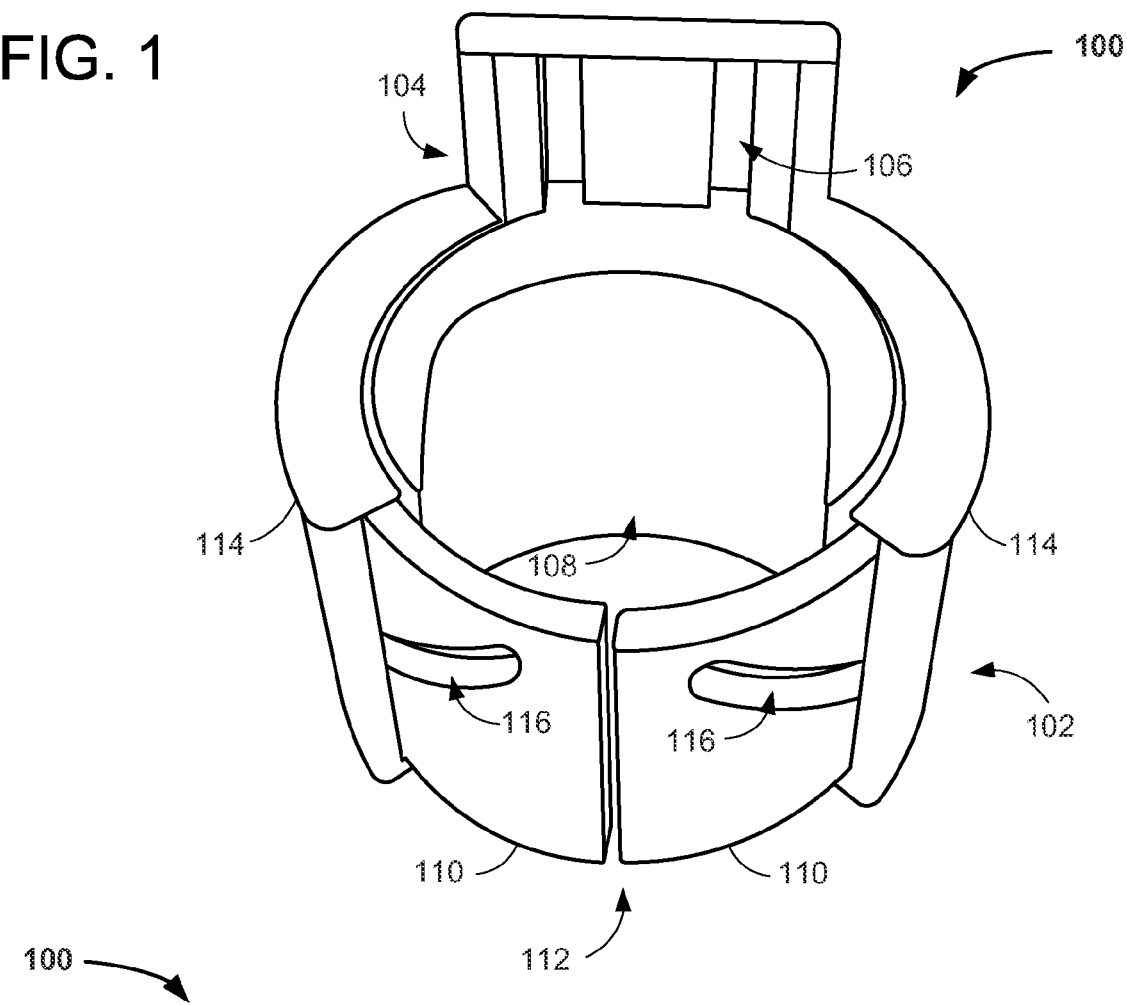
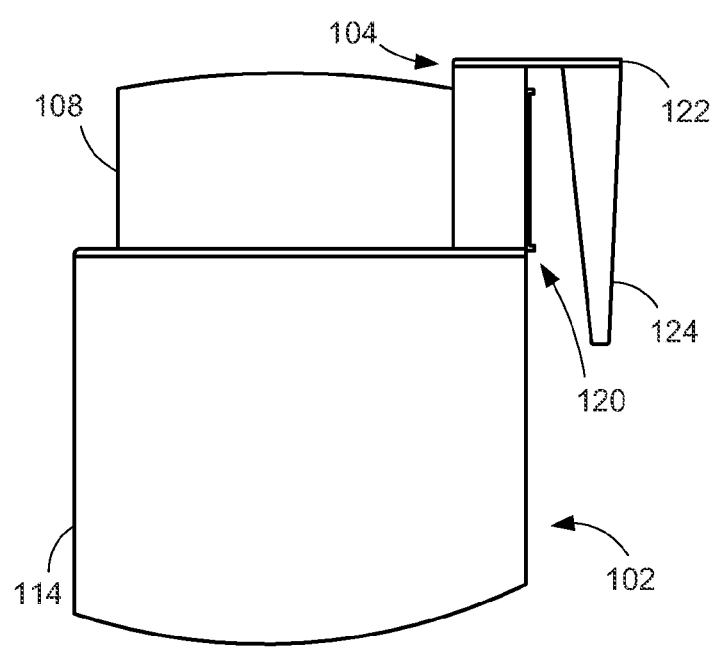
FIG. 2

INSTRUMENT RETENTION ASSEMBLY

RELATED APPLICATIONS

The present application makes a claim of domestic priority to U.S. Provisional Patent Application No. 61/478,447 filed Apr. 22, 2011.

BACKGROUND

An ability to effectively secure and retain a musical instrument in a predetermined physical orientation has been a continued goal of the music industry for many years. However, musical instrument mounts often lack reliability due to the elongated shape of most instruments and the sensitive nature of the various music reproduction components of the instruments. For stringed instruments, the tension and position of the strings must be maintained while mounted. Meanwhile for valve instruments, the moving valve components must be unaltered while mounted.

As such, an instrument mounting apparatus may provide efficient ingress and egress, but the instrument may be maintained in a precarious position in which the slightest instrument movement dislodges the mounted configuration and endangers the integrity and function of the instrument.

Accordingly, there is a continuing need for improved musical instrument retention assemblies that mount and secure an instrument efficiently and reliably.

SUMMARY

In accordance with various embodiments, a stationary base with at least two door shrouds extending from a tower portion. The tower portion has at least one groove communicating with a groove guide. An actuating housing is attached to the groove guide and connected to at least one force member positioned between the base and the actuating housing. At least one containment door is positioned in a door groove adjacent each door shroud. Each containment door communicates with the actuating housing with at least one guide pin positioned in a guide slot of each containment door, the guide slot being angled at a predetermined angle to translate vertical movement of the actuating housing to horizontal movement of each containment door.

These and various other features and advantages which characterize the claimed subject matter will be apparent from reading the following detailed description and a review of the associated drawings.

BRIEF DESCRIPTION OF THE DRAWINGS

The various embodiments are illustrated by way of example and not limitation in the figures of the accompanying drawings, in which like references indicate similar elements and in which:

FIG. 1 is a perspective view of an exemplary instrument retention assembly in accordance with the various embodiments.

FIG. 2 shows a side view of an exemplary instrument retention assembly in accordance with the various embodiments.

DETAILED DESCRIPTION

Figure 3:
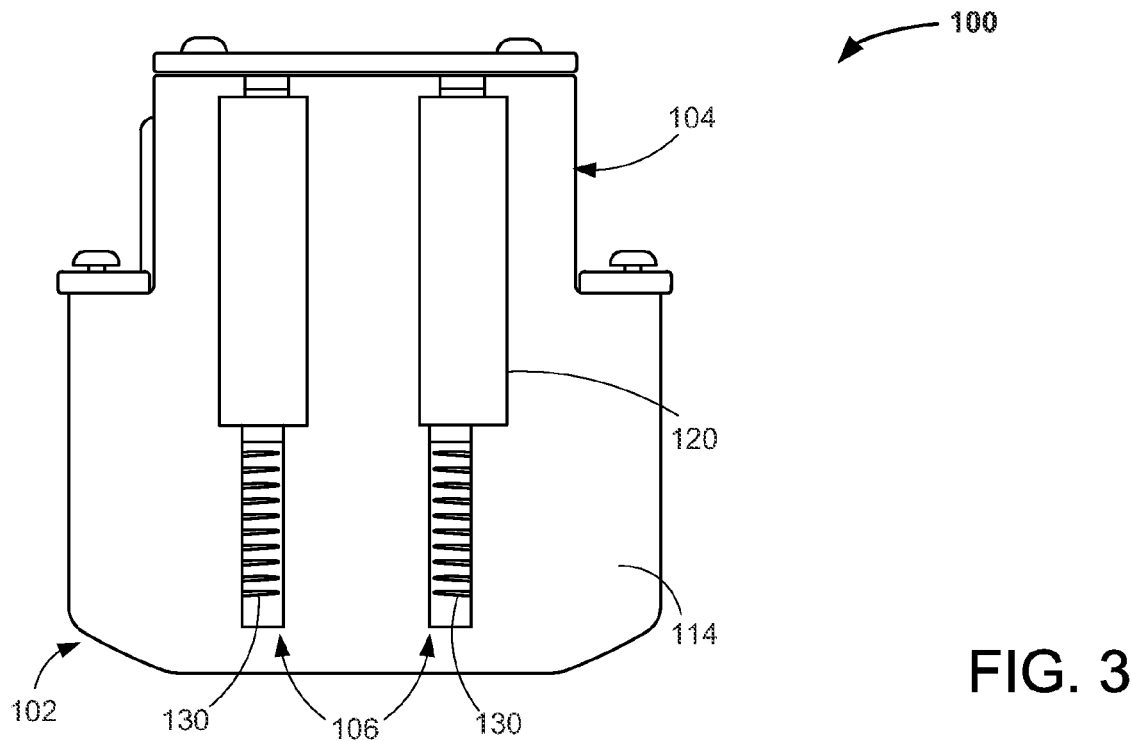
FIG. 3 generally illustrates a rear view of an exemplary instrument retention assembly in accordance with the various embodiments.

It will be readily understood that elements of the various embodiments described and illustrated in FIGS. 1-10 herein, could be arranged and designed in a wide variety of different configurations and may be presented in either software or hardware implementations.

With musical instrument mounting hardware, the musical instrument is held in place by gravity and maintained in various positions with at least a portion of the mounting hardware open to expose the musical instrument. Such mounting can prove to be precarious as any movement of the instrument can displace the mounted orientation through the opening in the hardware. As can be appreciated, the precarious mounting of finely tuned musical instruments poses both financial and sentimental dangers.

Accordingly, an instrument retention assembly can be constructed with an actuating housing that responds to a musical instrument's weight by translating the instrument's gravitational force to at least two containment doors that close around the musical instrument to secure it to the actuating housing. With the containment doors preventing the musical instrument from becoming dislodged from the actuating housing, the instrument is secure from inadvertent movement that could displace the instrument through the opening occupied by the containment doors.

Moreover, the securement of the musical instrument does not affect ingress and egress of the musical instrument from the actuating housing as the containment doors open to provide an opening as the instrument is picked up and gravitational forces from the instrument no longer are translated to the containment doors.

Turning to the drawings, FIG. 1 generally provides an instrument retention assembly 100 in accordance with various embodiments. The assembly has a stationary base 102 with a tower portion 104 (also referred to herein as a interface portion 104) that provides vertical guide slot grooves 106 that allow for sliding engagement of the actuating housing 108 in at least a vertical direction. The configuration of the actuating housing 108 extending through the tower portion 104 at the guide slot grooves 106 allows for horizontal retention of the actuating housing 108 while providing vertical displacement. Such vertical displacement can translates vertical force, such as the weight of a musical instrument, to horizontal force that acts to push containment doors 110 from the base 102 to partially or completely close the front opening 112 of the base 102 and actuating housing 108. In other words, when a weight greater than that of air, and sufficient to at least partially overcome a three of the force member 130 (of FIG. 3), is applied to the actuator housing 108, the containment doors 110 maintain an extended horizontal position. When the weight is sufficient to completely overcome the force of the three member 130, the containment doors maintain a fully extended horizontal position.

As shown, the base 102 has two arched door shrouds 114 that extend from the tower portion 104. Through vertical displacement of the actuating housing 108, the containment doors 110 retract and extend as vertical force is translated to horizontal force via angled guide slots 116. While not limiting, the actuating housing 108 can be configured to partially surround portions of a stringed instrument, such as a guitar or ukulele, by contacting the headstock and the back of the neck opposite the fingerboard so as to not disturb the stings or frets paramount to producing music. Various embodiments of the assembly 100 can further modify the aspects of the base 102, tower portion 104, actuating housing 108, and containment doors 110, as desired, to accommodate any musical instrument size, shape, and orientation.

In FIG. 2, the instrument retention assembly 100 is generally illustrated from a side. The orientation of the assembly 100 provides visual access to vertical guides 120 attached to the actuating housing 108 and extending through the vertical grooves in the tower portion 104 of the base 102. The vertical guides 120 can allow the actuating housing 108 to vertically displace along the tower portion 104 in a controlled manner that facilitates efficient translation of vertical force to horizontal force.

In various embodiments, the tower portion 104 can have a hanger 122 that extends behind the base 102 a predetermined distance to allow a hanging feature 124 to engage a corresponding mounting feature (not shown) to secure the assembly 100 to any available wall, floor, and stand. It should be noted that the hanging feature 124 is merely exemplary and can be a variety of different configurations to facilitate attachment to corresponding mounting features. One such different configuration can be a tapered hole that can surround a mounting pole to provide secure assembly 100 installation.

An exemplary rear view of the instrument retention assembly 100 is generally provided in FIG. 3. The rear view illustrates one possible embodiment of the vertical guides 120 in which each guide is configured with tabs that are larger than the vertical grooves 106 to retain the actuating housing 108 within the grooves 106 during operational and static conditions. The vertical displacement of the actuating housing 108 can be aided by one or more force members 130 that can be manufactured as any number of non-limiting components, such as springs, magnets, and screws. The inclusion of the force members 130 can provide default positions for the actuating housing 108 that can be configured to operate the containment doors 110 in a variety of different configurations in relation to the housing's 108 vertical location in the interface portion 104.

Figure 4:
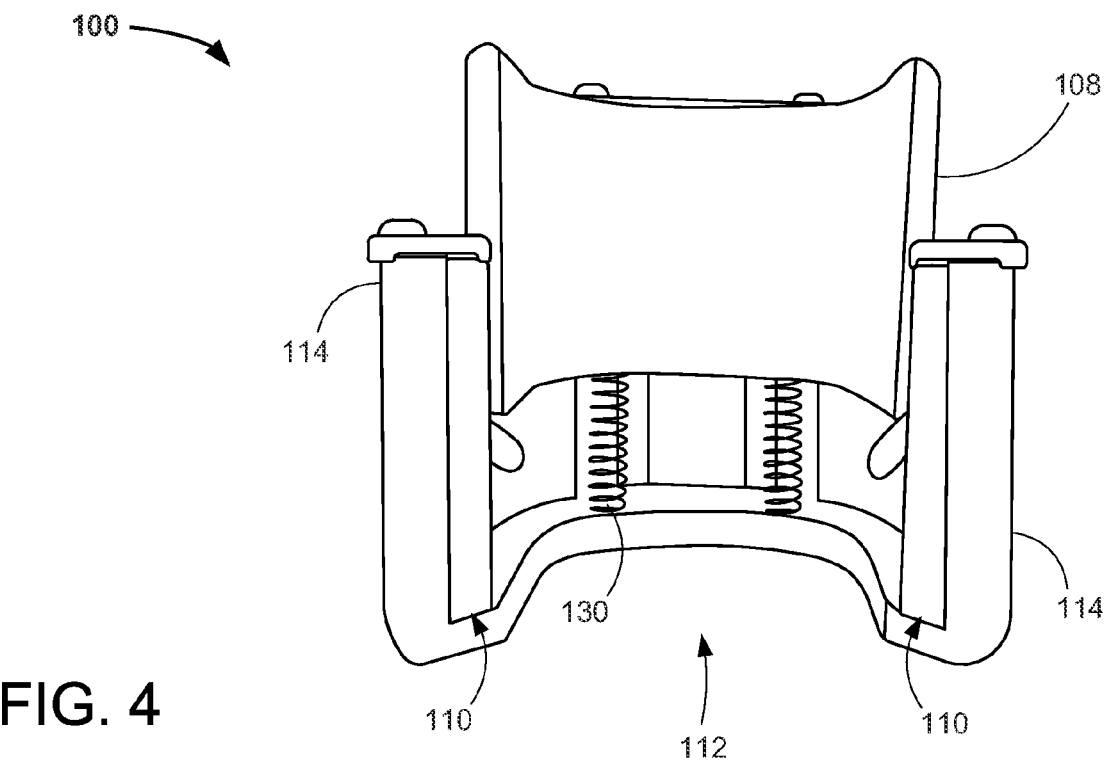
FIG. 4 displays a front view of an exemplary instrument retention assembly in accordance with the various embodiments.

FIG. 4 shows a front view of the instrument retention assembly 100 with the actuating housing 108 in a default position where the force members 130 act to maintain the actuating housing 108 vertically displaced on the tower portion 104 of the base so that the containment doors are fully retracted and the front opening is clear for instrument engagement. As shown, a tack of force on the actuating housing 108 corresponds to the containment doors 110 being fully retracted in the door shrouds 114 of the base 102. Such full retraction can provide efficient ingress for instruments through opening 112 and access to the actuating housing 108 without interference. While not required, the force members 130 can be configured to apply a predetermined amount of vertical force upward on the actuating housing 108, which can ensure full retraction of the containment doors 110 and a completely exposed opening 112.

Figure 5:
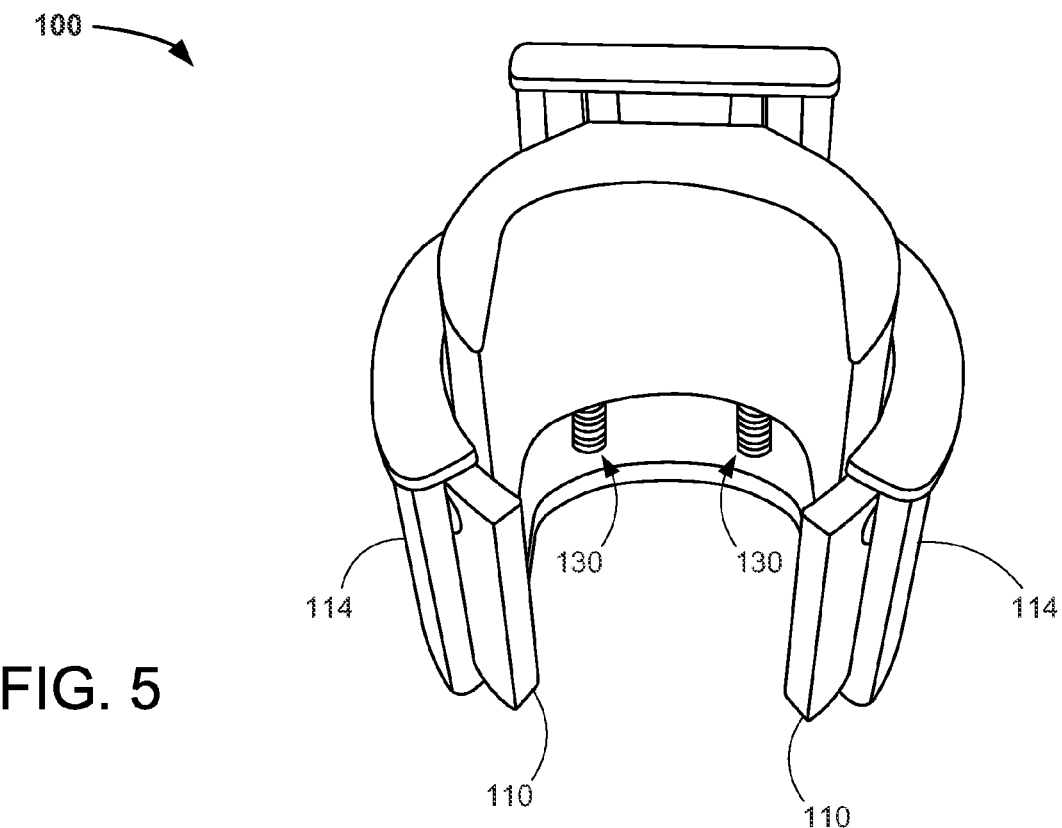
FIG. 5 provides a perspective view of an exemplary instrument retention assembly as operated in accordance with the various embodiments.

FIG. 5 generally illustrates the instrument retention assembly 100 as operated in accordance with various embodiments. Partial depression of the actuating housing 108 overcomes the vertical force of the force members 130 and begins to close the opening 112 with horizontal extension of the containment doors 110. It should be noted that the size, shape, number, and closing manner of the containment doors 110 is not limited to that shown in the present disclosure as various configurations can be used to close the opening 112 through translation of vertical force from the actuating housing 108 to horizontal force.

Figure 6:
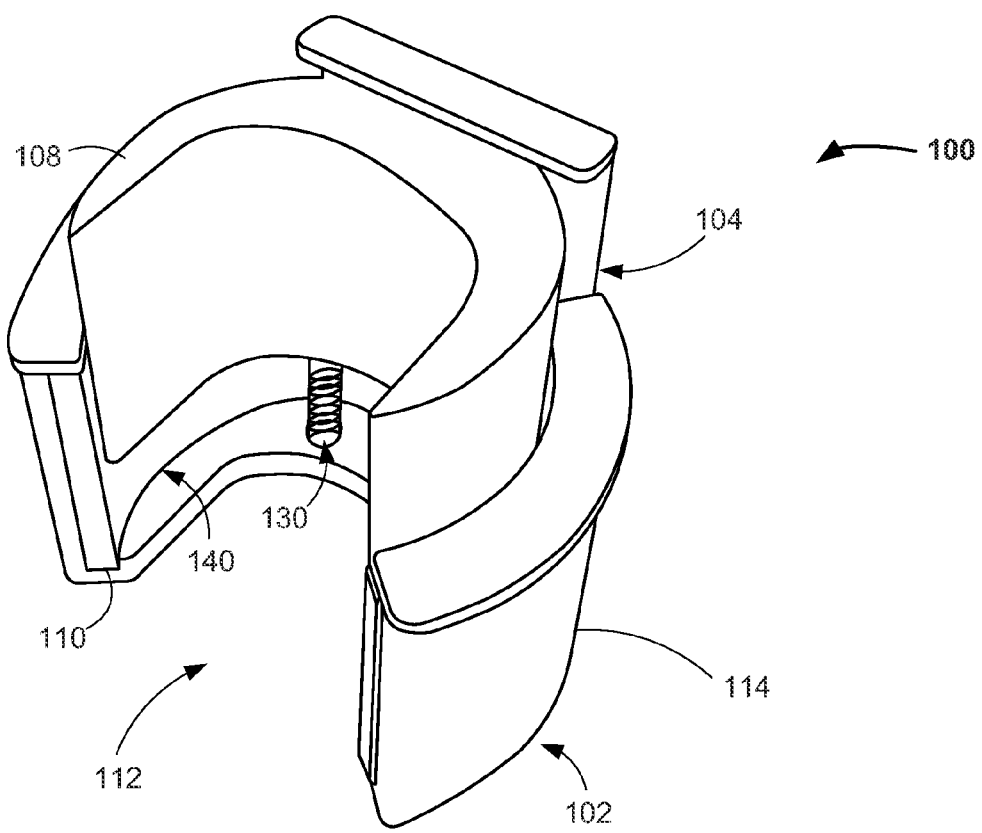
FIG. 6 shows a perspective view of an exemplary instrument retention assembly in accordance with the various embodiments.

FIG. 6 provides a perspective view of the instrument retention assembly 110 that generally displays how the containment doors are housed in the door shrouds 114 of the base 102. That is, each containment door 110 is fully retracted in a door groove 140 of the door shroud 114. The door groove 140 can be configured to completely lie on the interior of the door shroud 114 so that the bounds of the base 102 guard against debris and interference with containment door 110 and door groove 140 interaction. Such configuration can further allow the containment doors 110 to efficiently retract and extend to close the opening 112 while maintaining predetermined alignment with respect to the base 102 and the actuating housing 108.

Figure 7:
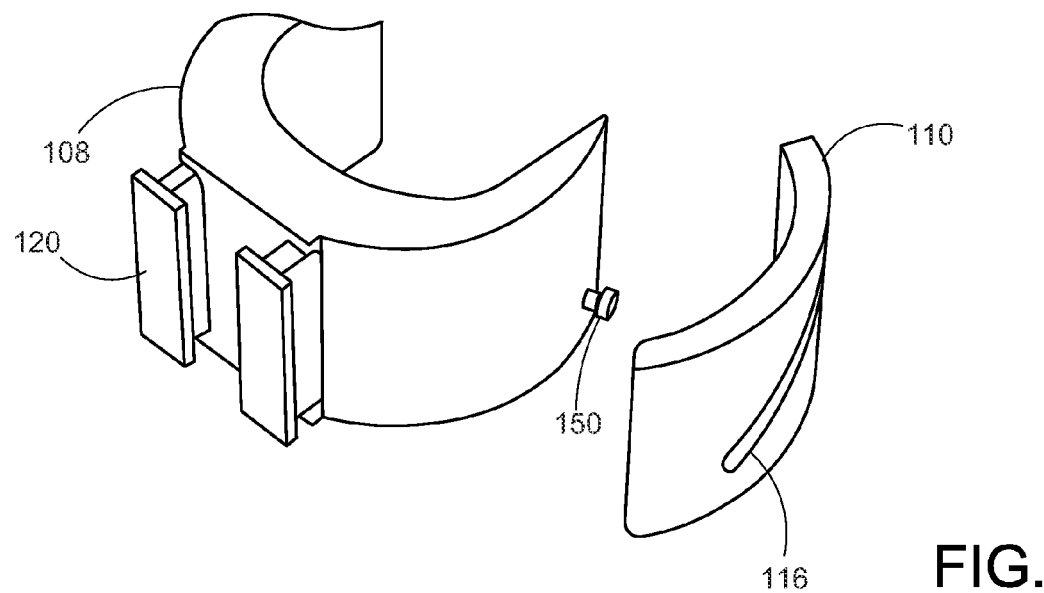
FIG. 7 illustrates various individual aspects of an exemplary instrument retention assembly in accordance with the various embodiments.

FIG. 7 shows portions of an exemplary instrument retention assembly while the assembly is deconstructed. Such deconstruction allows the guide pin 150 attached to the actuating housing 108 to be easily shown. A containment door 110 is provided in spaced apart orientation to illustrate an exemplary position of the guide pin 150 with the guide slot 116, which facilitates translation of vertical movement of the actuating housing 108 to the horizontal containment door 110 movement. It some embodiments, the actuating housing 108 has more than one guide pin 150 that interacts with the containment doors 110 to provide horizontal action.

Figure 8:
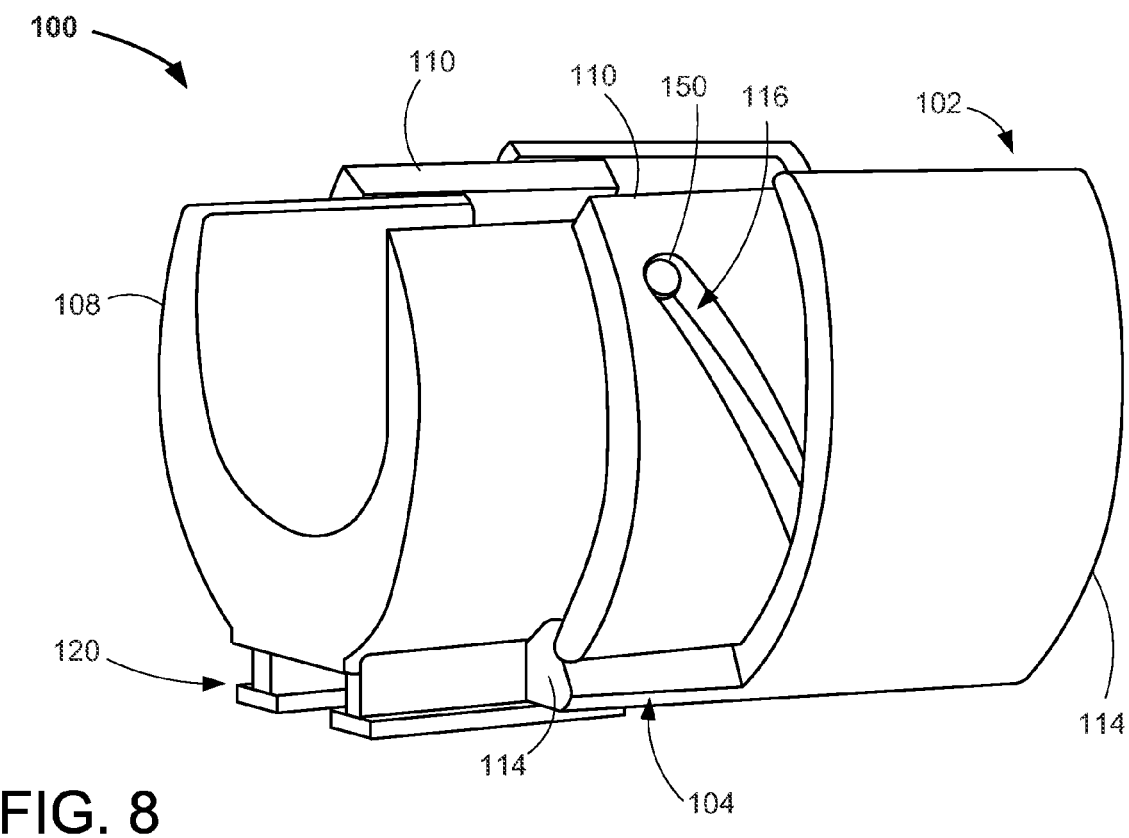
FIG. 8 generally displays an exploded view of an exemplary instrument retention assembly in accordance with the various embodiments.

FIG. 8 generally illustrates a partially exploded view of an exemplary instrument retention assembly 100 that displays how the guide pin 150 seats in the guide slot 116 of the containment door 110. FIG. 8 further shows how the containment door 110 and guide pin 150 are fully protected by the door shroud 114 of the base 102. As can be appreciated by one skilled in the art, the guide slot 116 is angled at a predetermined degree to allow efficient, but controlled, horizontal movement of the containment door 110 in relation to the vertical movement of the actuating housing 108.

Figure 9:
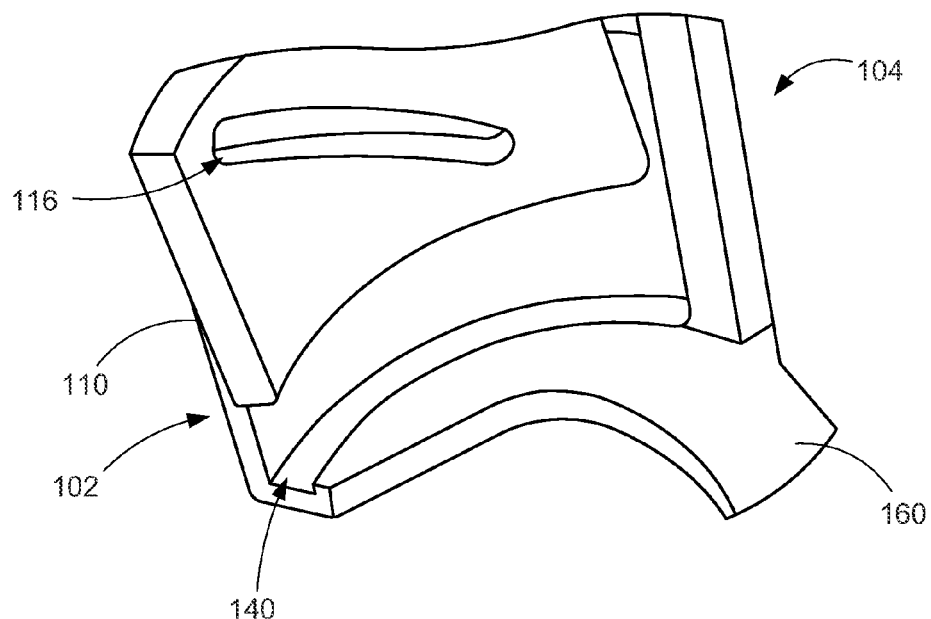
FIG. 9 shows a perspective view of portions of an exemplary instrument retention assembly in accordance with the various embodiments

FIG. 9 is a perspective view of a portion of a deconstructed instrument retention assembly that displays one possible, but non-limiting, configuration of the door groove 140. As shown, the door groove 140 is continuously arched to match the shape and size of the containment door 110 to provide controlled movement of the door 110 throughout the closure and revealing of the opening 112. FIG. 9 further illustrates force member features 160 that are recesses in the base 102 that allow the force members 130 to be reliably anchored in place. Such anchoring can be aided by various fastening means, such as glue, screws, and magnets.

Figure 10:
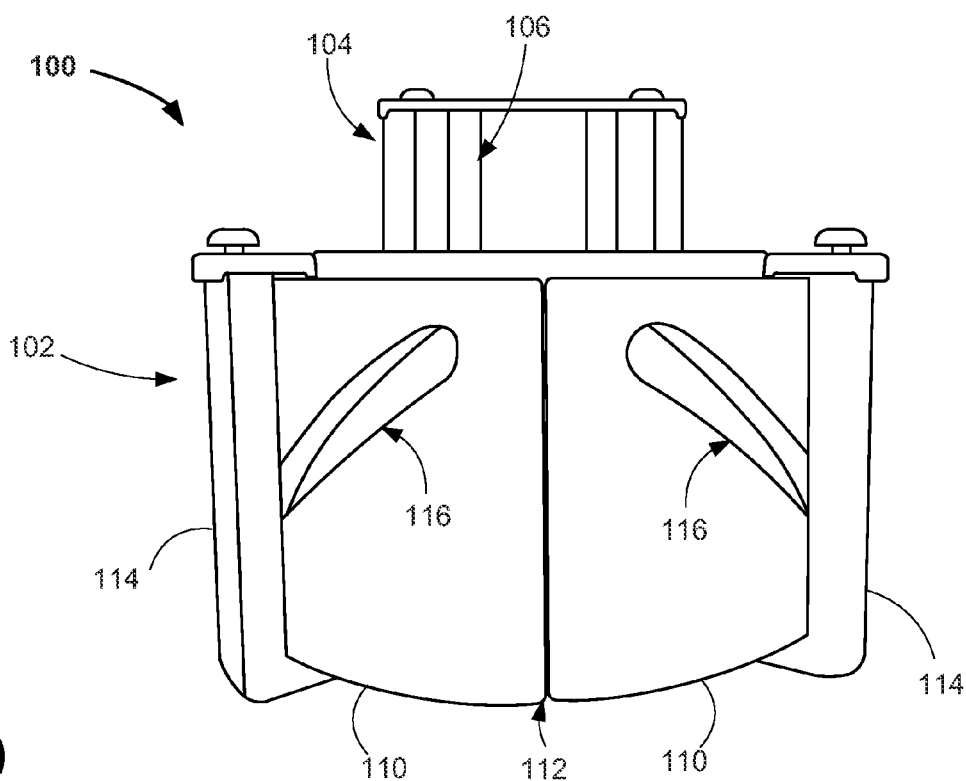
FIG. 10 is a front view of an exemplary instrument retention assembly as operated in accordance with the various embodiments.

Finally in FIG. 10, a front view of an exemplary instrument retention assembly 100 is displayed as operated in accordance with various embodiments. It is contemplated that the weight of a musical instrument placed onto the actuating housing 108 will fully depress the housing 108, as shown, which corresponds with complete closure of the opening 112 with the containment doors 110. With such opening closure, the instrument will be secured within the actuating housing 108, door shrouds 114, and containment doors 110 so that inadvertent movement of the assembly 100 and instrument will not endanger the release of the instrument through the opening 112.

As will be apparent to those skilled in the art, a number of modifications could be made to the various embodiments which would not depart from the spirit or the scope of the present technology. While the presently provided embodiments have been described for purposes of this disclosure, numerous changes and modifications will be apparent to those skilled in the art. In particular, it is recognized that the actuating housing disclosed herein may be modified in whole or in part, with equal effectiveness, to be applicable to various musical instruments as well as a variety of instrument mounting orientations, such as diagonal and sideway position. Accordingly, such changes, modifications, or selected implementations are encompassed within the spirit of this disclosure.

What is claimed is:

1. An apparatus comprising:
    a stationary base providing an interface portion and at least a door shroud provided by and extending from the interface portion, the interface portion further having at least one groove communicating with a groove guide;
    an actuating housing attached to the groove guide, the actuating housing connected to at least one force member positioned between the base and the actuating housing; and
    a containment door positioned in it door groove of the stationary base and adjacent said door shroud, said containment door communicating with a stationary guide pin provided by the actuating housing, said stationary guide pin interacts with a guide slot provided by the containment door, said guide slot angled at a predetermined angle relative to the actuating housing, in which movement of said containment door occurs upon movement of the actuating housing, and wherein the containment door maintains an extended horizontal position while the actuating housing is engaged with a weight greater than a portion of a three of the force member.

2. The apparatus of claim 1, wherein the actuating housing extends into the stationary base.

3. The apparatus of claim 1, wherein the actuating housing is in sliding communication with the stationary base.

4. The apparatus of claim 1, wherein at least one force member resists vertical motion of the actuating housing.

5. The apparatus of claim 4, wherein the at least one force member is a spring.

6. The apparatus of claim 1, wherein the at least two shrouds are configured to surround lateral sides of an instrument.

7. The apparatus of claim 1, wherein the containment door is housed within a door shroud when the actuating housing is in a default position.

8. The apparatus of claim 7, wherein the default position corresponds with no weight being placed on the actuating housing.

9. The apparatus of claim 7, wherein the default position corresponds with an unimpeded front opening of the stationary base.

10. The apparatus of claim 1, wherein said interface portion extends from the stationary base.

11. The apparatus of claim 10, wherein the interface portion extends beyond a height of the at least one containment door.

12. The apparatus of claim 1, wherein the door groove is positioned within the bounds of the door shroud.

13. The apparatus of claim 1, wherein the door groove is positioned between the door shroud and a front opening of the stationary base.

14. The apparatus of claim 1, in which said movement of said containment door is a horizontal movement, and wherein said movement of said actuating housing is a vertical movement.

* * * * *